(12) United States Patent
Johnson et al.

(10) Patent No.: US 12,115,939 B2
(45) Date of Patent: Oct. 15, 2024

(54) ROTATABLE BOX STEP

(71) Applicant: Magna Exteriors Inc., Concord (CA)

(72) Inventors: Jeffrey R. Johnson, White Lake, MI (US); Mriya Neeloy Kumar Bakshi, Royal Oak, MI (US); Adolfo E. Milani, Commerce, MI (US)

(73) Assignee: MAGNA EXTERIORS, INC., Ontario, CA (US)

( * ) Notice: Subject to any disclaimer, the term of this patent is extended or adjusted under 35 U.S.C. 154(b) by 474 days.

(21) Appl. No.: 17/440,088

(22) PCT Filed: Mar. 26, 2020

(86) PCT No.: PCT/US2020/025030
§ 371 (c)(1),
(2) Date: Sep. 16, 2021

(87) PCT Pub. No.: WO2020/198514
PCT Pub. Date: Oct. 1, 2020

(65) Prior Publication Data
US 2022/0185190 A1 Jun. 16, 2022

Related U.S. Application Data

(60) Provisional application No. 62/823,879, filed on Mar. 26, 2019.

(51) Int. Cl.
*B60R 3/02* (2006.01)
(52) U.S. Cl.
CPC ..................... *B60R 3/02* (2013.01)
(58) Field of Classification Search
CPC ......... B60R 3/02; B60R 3/002; B60R 16/005; B60R 16/02; F16H 1/16; F16H 1/20
See application file for complete search history.

(56) References Cited

U.S. PATENT DOCUMENTS 3,339,122 A * 8/1967 Sangster ............ G05B 19/0405
310/94
6,523,283 B2 * 2/2003 Sueshige ............. F16D 43/2024
477/178
(Continued)

FOREIGN PATENT DOCUMENTS

DE         19608048 A1 *  9/1997 ............... B60R 3/02
DE    102012106470 A1 *  6/2013 ............. B60R 19/48
(Continued)

OTHER PUBLICATIONS

Notification of Transmittal of the International Preliminary report on Patentability for International Application No. PCT/US2020/025030, Mailed Oct. 7, 2021.

*Primary Examiner* — James A Shriver, II
*Assistant Examiner* — Michael T. Walsh
(74) *Attorney, Agent, or Firm* — Warn Partners, P.C.

(57) ABSTRACT

A box step for allowing a user to access the rear bed or box of a vehicle such as a pickup truck. The pivotable box step includes a housing that is mounted to the underside of the vehicle. The box step moves between a stowed position tucked underneath the vehicle, a rear position at the rear of the vehicle, a corner position at the rear corner of the vehicle and a side entry position at the side of the vehicle, forward from the corner entry position. The motor drives the drive assembly in opposing first and second directions to move the box step between the stowed position, the rear position, the corner position and the side entry position.

21 Claims, 5 Drawing Sheets

(56) References Cited

U.S. PATENT DOCUMENTS

| | | | |
|---|---|---|---|
| 7,490,889 B1 | 2/2009 | Scoggins | |
| 8,342,551 B2 * | 1/2013 | Watson | B60R 3/02 |
| | | | 280/166 |
| 9,067,541 B2 * | 6/2015 | Sobecki | B60R 1/074 |
| 9,649,983 B2 * | 5/2017 | Watson | B60R 3/02 |
| 10,308,183 B2 * | 6/2019 | Fuchs | B60R 1/074 |
| 10,343,610 B2 * | 7/2019 | Long | B60R 3/002 |
| 10,618,472 B2 * | 4/2020 | Du | B60R 3/02 |
| 2003/0116938 A1 * | 6/2003 | Shields | B60R 3/007 |
| | | | 280/166 |
| 2005/0173886 A1 * | 8/2005 | Leitner | B60R 3/02 |
| | | | 280/166 |
| 2006/0082096 A1 | 4/2006 | Sukonthapanich et al. | |
| 2010/0320715 A1 * | 12/2010 | Watson | B60R 3/02 |
| | | | 74/424.78 |
| 2017/0298675 A1 * | 10/2017 | Dimig | B60R 3/02 |
| 2022/0267090 A1 * | 8/2022 | Rocholl | F16H 19/08 |

FOREIGN PATENT DOCUMENTS

| | | | | |
|---|---|---|---|---|
| EP | 0362574 A1 * | 4/1990 | | |
| EP | 0421407 A1 * | 4/1991 | | |
| WO | WO-2023214120 A1 * | 11/2023 | | B60R 3/02 |

* cited by examiner

ROTATABLE BOX STEP

FIELD OF THE INVENTION

The present invention relates to a retractable box step for a vehicle that rotates between a stowed position and several deployed positions.

BACKGROUND OF THE INVENTION

Pickup trucks include a box or bed selectively dosed by a tailgate extending between a pair of sidewalks. From time to time, individuals must access the bed in order to load and unload cargo. When the tailgate is closed, individuals can access the bed without opening the tailgate by stepping onto a rear bumper and then reaching or climbing over the tailgate. When the tailgate is open, the tailgate lies directly over the rear bumper such that the majority of the rear bumper is not available for use as a step to individuals seeking access to the bed. Further, some individuals find it difficult to access the bed via the rear bumper even when the tailgate is closed. This difficulty results from the fact that the mar bumper of many pickup trucks is at a height that is too high for many individuals to comfortably step onto. Also, current designs allow for a step to pivot between a retracted position and a deployed position. However, these designs typically only allow the user to access the box at one location. It is desirable to provide a box step that is positionable between a stowed position and several other positions so that a single step allows for several different box entrance positions.

SUMMARY OF THE INVENTION

The present invention relates to a pivotable box step for allowing a user to access the rear bed or box of a vehicle such as a pickup truck. The pivotable box step includes a housing that is mounted to the underside of the vehicle. In one particular embodiment of the invention the housing is mounted to the vehicle frame at the side or rear corner just forward of the rear bumper. Within the housing there is drive assembly that is coupled to a motor. A box step is coupled to the drive assembly and is movable relative to the pivot assembly, The box step moves between a stowed position tucked underneath the vehicle, a rear position at the rear of the vehicle, a corner position at the rear corner of the vehicle and a side box entry position at the side of the vehicle, forward from the corner entry position. The motor drives the drive assembly in opposing first and second directions to move the box step between the stowed position, the rear position, the corner position and t he box side entry position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
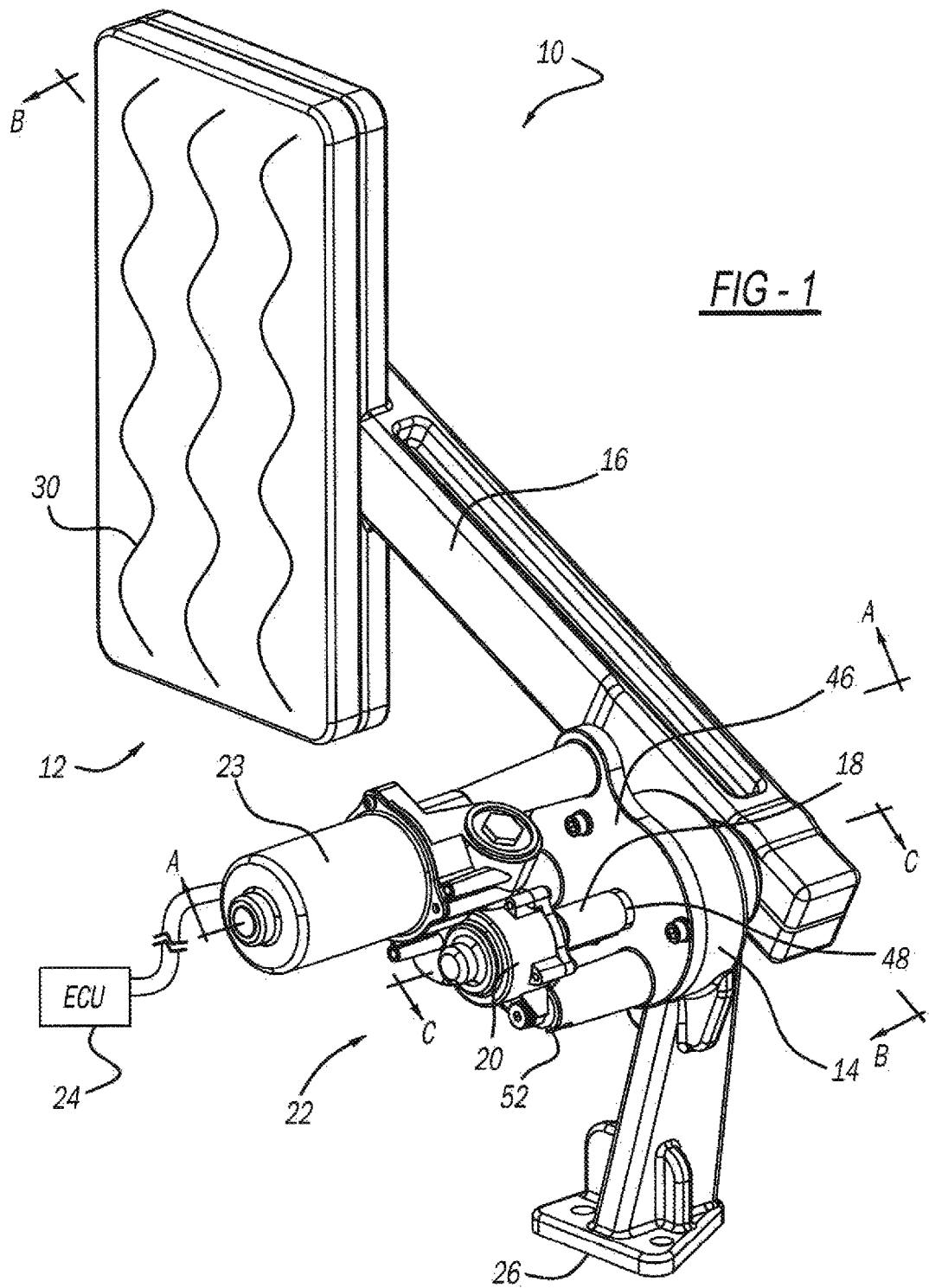
FIG. 1 is a top perspective view of a rotatable box step in accordance with one embodiment of the present invention.

The following description of the preferred embodiment(s) is merely exemplary in nature and is in no way intended to limit the invention, its application, or uses.

Referring to FIGS. 1-5, a pivotable box step arrangement 10, in one embodiment includes a box step 12, a pivot assembly 14 with an output shaft 15, a drive, arm 16, a drive assembly 20, a vertical motor assembly 22, an electronic control unit 24, and a mounting bracket 26. The mounting bracket 26 is adapted for attachment to a frame 28 of a vehicle. While mounting to the frame 28 is described it is within the scope of the invention for the frame 28 to be some other structure of the vehicle having suitable strength for connecting the mounting bracket.

Figure 2:
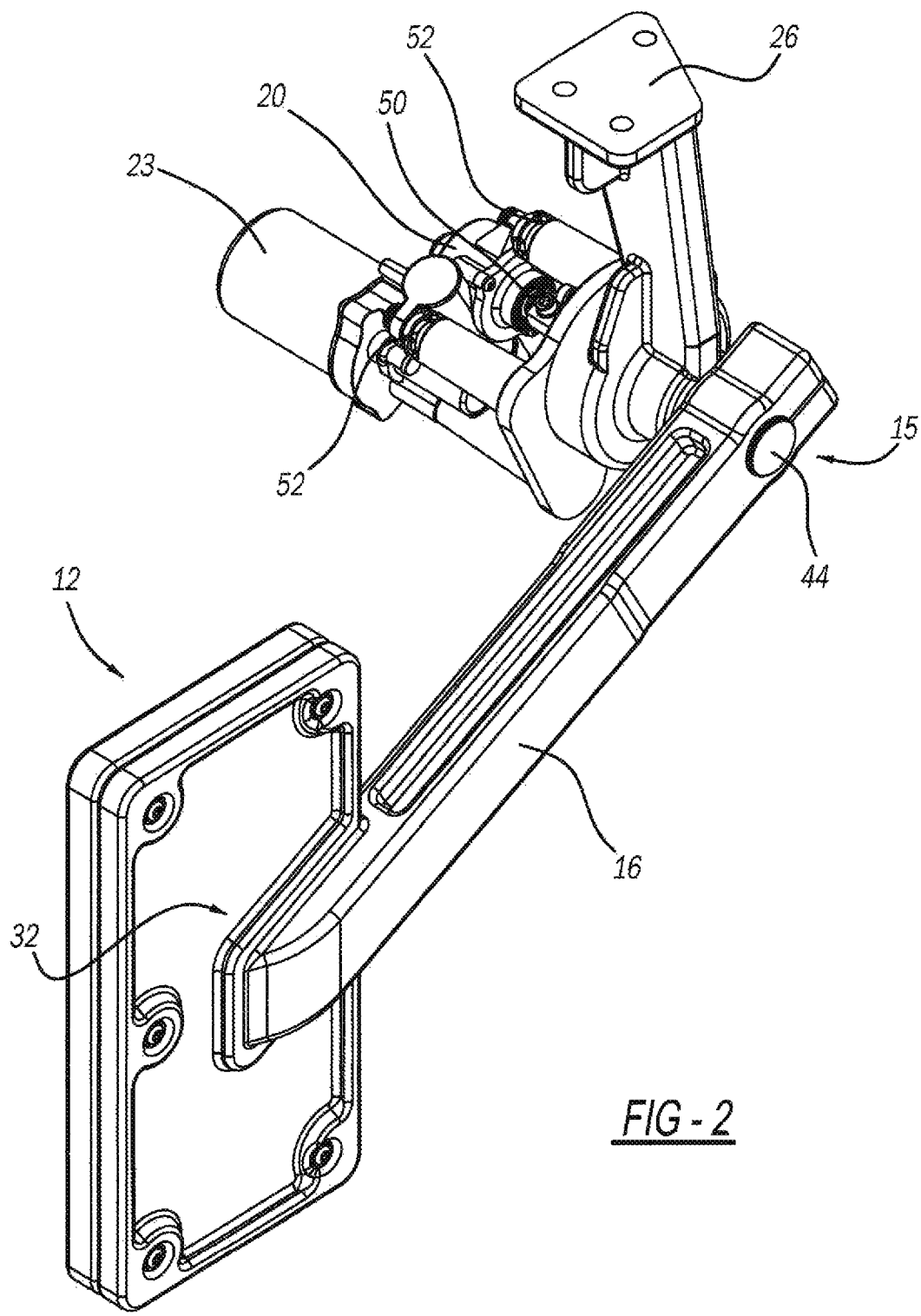
FIG. 2 is a bottom perspective view of the rotatable box step in accordance with one embodiment of the present invention.
Figure 3:
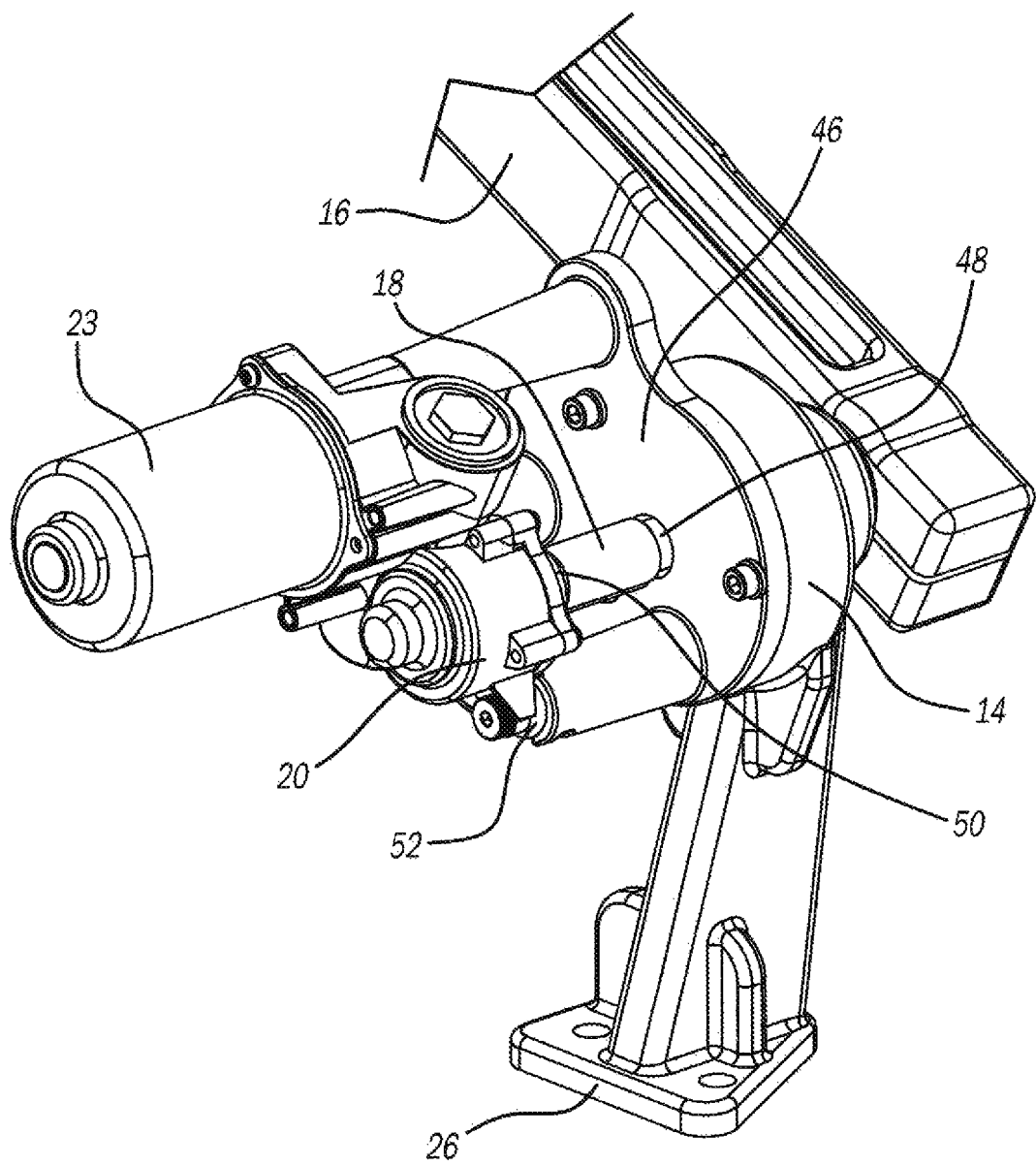
FIG. 3 is an enlarged bottom perspective view of the vertical actuator and transmission of the rotatable box step in accordance with one embodiment of the present invention.
Figure 4:
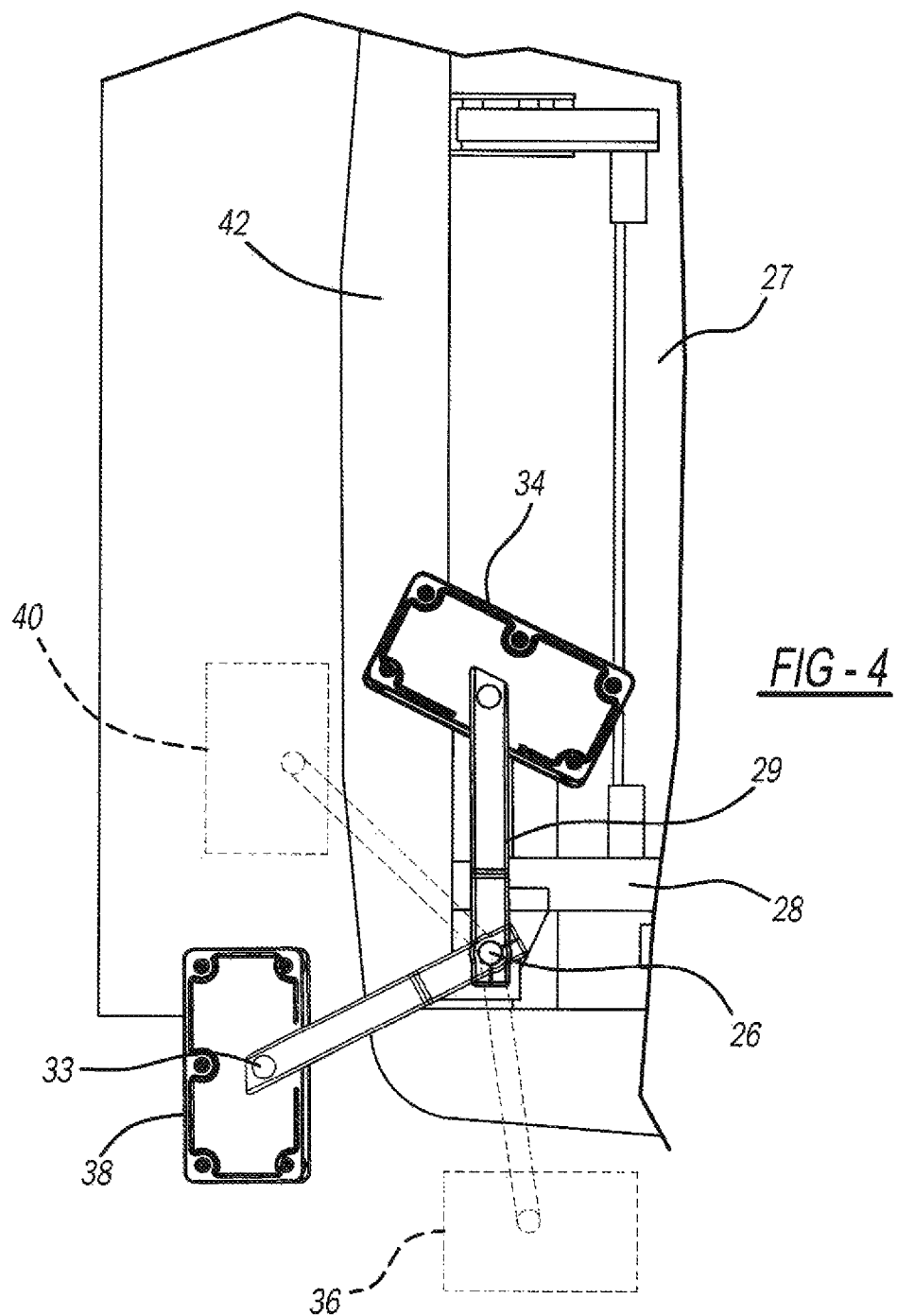
FIG. 4 is an overhead plan view of the rotatable box step in accordance with one embodiment of the present invention.

The box step 12 has a top wall 30 providing a tread surface thereon. The box step 12 is connected to the drive arm 16 at a joint 32 as shown in FIGS. 1-3. The joint 32 is arranged generally a horizontal snap fit connection at the end of the drive 16 arm. While a snap fit connection is described it is within the scope of the invention for any type of suitable connection to be used, such as welding, adhesives or fasteners. FIG. 4 depicts an alternate to the joint 32 by having joint 33 that allows the box step 12 to pivot about the joint 33 either manually or mechanically rotated about the joint 33 using an actuator (not shown). This allows the top wall 30 to be rotated to a position where the most surface area of the top wall 30 can be used by the user.

The drive 16 arm pivotally couples to the output shaft 15 of the pivot assembly 14 that is connected to the frame 28 using the mounting bracket 26. The box step 12 moves between a stowed position 34, a side entry position 36, a corner position 38 and a rear position 40 as shown in FIG. 4. While four positions are shown it is within the scope of the invention for the box step 12 to be positioned at a greater or lesser number of positions between the stowed position 34 and the side entry position 36. In the stowed position 34, the box step 12 is generally tucked underneath a vehicle 27 forward of a rear bumper 42, so as to be somewhat hidden from view and to provide a cleaner, more integrated look to the vehicle 27. In the side entry position 36 the box step 12 extends generally outwardly from the side of the box or bed of the vehicle 27, to assist a user trying to access a portion of the box that is more forward or just behind the vehicle cab. When in the rear position 40 the box step 12 is positioned rearward of the rear bumper 42 to assist the user in accessing the rear portion of the box of the vehicle. When in the corner position 38 the box step 12 is positioned so that the tailgate of the vehicle can be lowered but the user can still stand on the top wall 30 to access the rear portion of the box.

The box step 12 pivots with the drive arm 16 between positions by using a pivot assembly 14 that is connected to one end of the drive arm 16. In one embodiment the drive arm 16 is manually moved between positions by a user simply grabbing the box step 12 and rotating it to a desired position. In such an embodiment the pivot assembly 14 contains spring loaded locking detents that extend through the housing of the pivot assembly 14 and contact apertures formed on the output shaft 15 that engage the lock pin to lock the output shaft 15 at predetermined stop locations. In another embodiment the output shaft 15 of the pivot assembly 14 is spring loaded and there is a release lever or button on the housing of the pivot assembly 14 that is depressed to cause the box step 12 to pivot.

Referring to FIGS. 1-3 and 5 more details of a vertical motor assembly 22 connected to the mounting bracket 26 are shown. The drive arm 16 is connected to the output shaft 15 of the pivot assembly 14. The output shaft 15 is rotatably disposed within the pivot assembly 14 that serves as a base for connecting the vertical motor assembly 22 thereon. The pivot assembly 14 is connected to or formed with the mounting bracket 26. The output shaft 15 has a first end 44 that extends outside of the housing of the pivot assembly 14 and connects to the drive arm 16. The output shaft 15 extends through the pivot assembly 14 and a mounting base 46 connected to the pivot assembly 14 to a second end 48 and is connected to a coupler 18. The coupler 18 connects between the second end 48 and a drive output shaft 50 of the drive assembly 20 and acts to transmit rotational force between the drive output shaft 50 and the drive assembly 20, while accommodating misalignment between the drive output shaft 50 and the drive assembly 20, which will be described in greater detail below. The vertical drive assembly 22 contains a two stage worm drive that includes a first worm gear 58 connected to the motor 23. The drive assembly 20 allows for different output ratios to be used depending on the particular application.

In order to accommodate packaging requirements in an area around the rear bumper 42 and frame member 28 of the vehicle, the motor used has a vertical orientation meaning that a longitudinal axis A-A of a motor 23 is generally perpendicular to a longitudinal axis B-B of the drive arm 16. The longitudinal axis AA is parallel to a longitudinal axis C-C of the output shaft 15 of the vertical motor assembly 22. During use of the box step 12 forces exerted on the box step can be great enough to cause the output shaft 15 to shift along the longitudinal axis C-C. Forces exerted on the box step 12 can range from subtle vibrations to heavy loads being placed on the drive arm 16 that can cause the output shaft 15 to shift or wobble. The forces can cause movement or possible misalignment between the output shaft 15 and the drive output shaft 50. In order to absorb the forces exerted on the output shaft 15 and prevent misalignment the coupler 18 in some embodiments is made of flexible material. However, in other embodiments the coupler 18 is more rigid and is made of harder materials such as steel, aluminum or other suitable material. However, the coupler 18 functions to preserve functional alignment between the output shaft 15, drive output shaft 50 and all of the various components connected to the output shaft 15 and drive output shaft 50. Optionally there are rubber washers 52 placed between the drive assembly 20 and the mounting base 46 which can be used independent from or in addition to a flexible coupler. The rubber washers 52 function to absorb forces between the mounting base and drive assembly 20.

Figure 5:
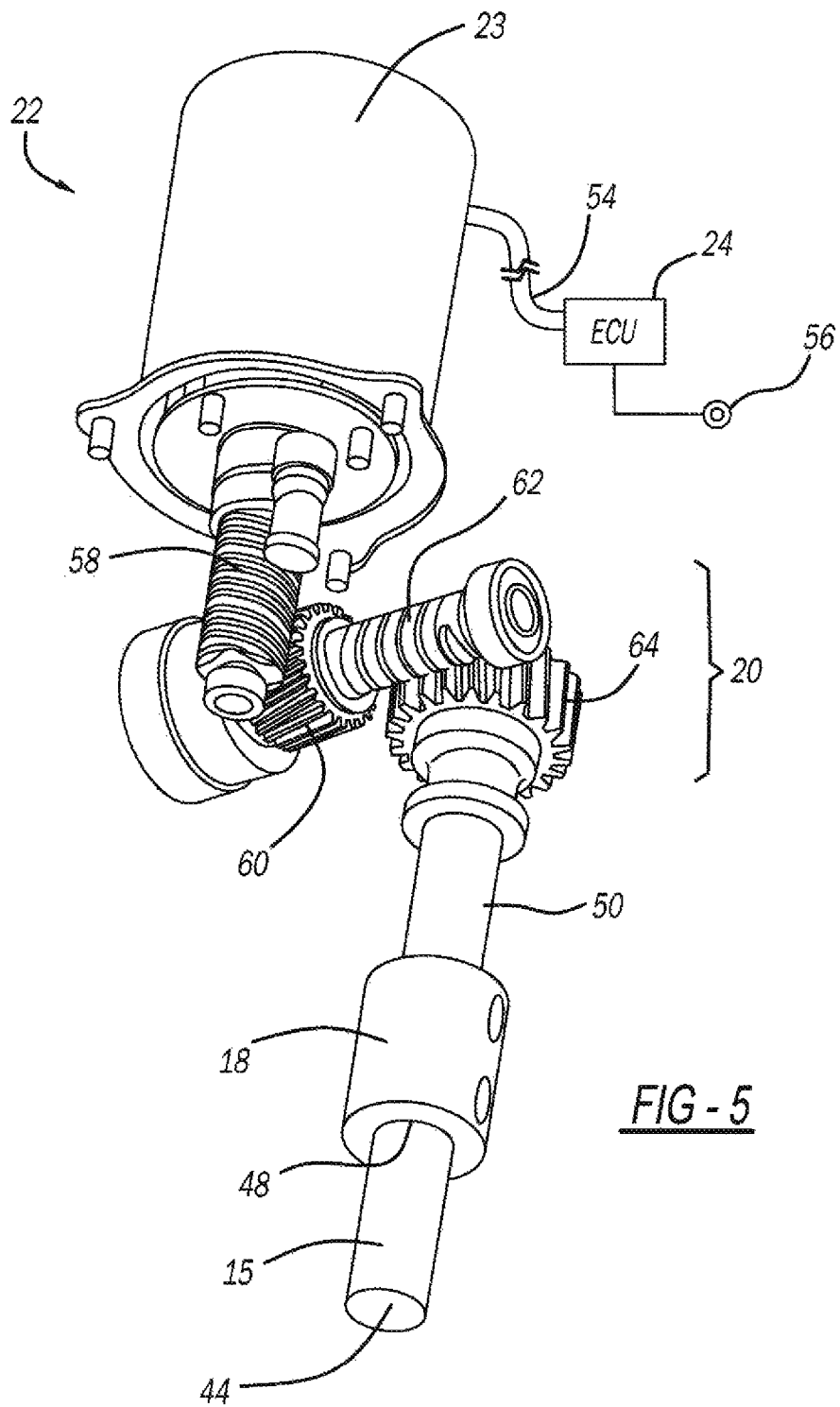
FIG. 5 is a side perspective view of the vertical motor assembly and the drive assembly with portions of the housing removed.

The drive assembly 20 includes a second worm gear 62 disposed within a drive housing portion and rotatable therein. The second worm gear 62 is operably coupled to the motor 23 as described with respect to FIG. 5. Referring additionally to FIG. 5 a view of the drive assembly 20 and vertical motor assembly 22 are shown. The vertical motor assembly 22 includes the first worm gear 58 that is connected to and driven by the motor 23. The first worm gear 58 is in mesh engagement with a first tooth gear 60 of the drive assembly 20. The first tooth gear 60 is connected linearly to the second worm gear 62. The second worm gear 62 is in mesh engagement to a second tooth gear 64 that is connected to the top of the drive output shaft 50. The drive output shaft 50 has an end that connects to the coupler 18, which is connected to the output shaft 15 of the pivot assembly 14.

During operation the motor 23 rotates the first worm gear 58 in a first direction. The first worm gear 58 is in mesh engagement with and causes the first tooth gear 60 to rotate in a first direction opposite the first direction of the first worm gear 58. The rotation of the first tooth gear 60 in the first direction causes the second worm gear 62 to rotate in a first direction that is the same as the direction of the first tooth gear 60 since they are connected to each other. The rotation of the second worm gear 62 causes the second tooth gear 64, drive output shaft 50, coupler 18, output shaft and box step 12 to rotate in a first direction opposite the first direction of the second tooth gear 64. When the motor 23 is rotated in a second direction the first worm gear 58, first tooth gear 60, second worm gear 62, second tooth gear 64, drive output shaft 50, coupler 18, output shaft and box step 12 also will rotate in a second direction that is opposite to their first direction described above, thereby causing the box step 12.

The motor 23 includes a casing structure which includes a conventional position sensing and encoding motor that rotates a motor shaft (not shown) in opposing first and second directions. The position of the box step can be determined by the ECU 24 in many ways. The ECU 24 can switch on the motor 23 for a predetermined amount of time or by sensing the number of rotations of the drive output shaft 50 of the motor 23, first worm gear 58, first tooth gear 60, second worm gear 62 and the second tooth gear 64. The motor 23 is secured to the drive assembly 20. The casing structure is secured to the drive housing portion by a plurality of fasteners. It is appreciated that the casing structure may in one embodiment be considered part of the pivot assembly 14 as the pivot assembly 14 maintains the gear and motor components sealed from the external environment.

The electronic control unit 24 electronically controls the vertical motor assembly 22 to effect movement of the box step 12 between the stowed, cab entry, and box side step positions. The electronic control unit 24 is mounted within the vehicle at a location remote from the pivot assembly 14. The electronic control unit 24 is electrically connected to the vertical motor assembly 22, by a wiring harness 54 of the vehicle, and to a switch 56 incorporated on the body of the vehicle. The switch 56 can be located in the cab or the vehicle, on the side or in the side walls of the box. In another embodiment, the electronic control unit 24 may be physically mounted to the pivot assembly 14 or to the motor assembly 22, and electronically connected to the motor assembly 22.

The box step 12 is retained in the cab entry position after the motor assembly 22 is shut off as a result of the first worm gear 58, first tooth gear 60, second worm gear 62, second tooth gear 64, as it is known that the worm gears will not be back-driven. Thus, the first worm gear 58 and second worm gear 62 will resist an external force applied to the drive arm 16 in a direction away from the cab entry position and towards the stowed position as a result of the meshing engagement. When the switch member 56 is activated to move the box step 12 to the stowed position 34, the switch sends a signal to the electronic control unit 24. The electronic control unit 24 in response to the signal supplies an appropriate voltage to move the box step 12 to the stowed position 34. Specifically, the motor 23 rotates the first worm gear 58 in a rotational direction which in turn rotates the second worm gear 62 and ultimately the second tooth gear 64 and drive output shaft 50. This causes the output shaft 15 to rotate with the second tooth gear 64 and drives the drive arm 16 to pivot inwardly towards the vehicle to move the box step 12 to the stowed position. In one embodiment of the invention the electronic control unit 24 is then used to turn off the motor 23 when the box step 12 abuts a stow stop 29 which in this case is a surface on the frame 28 of the vehicle. However, it is within the scope of this invention for the stow stop 29 to be a surface on mounting bracket 26. The box step 12 will continue to move towards the stowed position until the box step 12 abuts the stow stop 29. A current spike is generated in the motor 23 as a result of the motor assembly 22 meeting a resistance to movement when the box step 12 hits the stow stop 29. The current spike will be instantaneously detected by the electronic control unit 24. In response to the current spike, the electronic control unit 24 turns off the motor 23.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pivotable box step comprising:
    a pivot assembly;
    a drive assembly disposed within said pivot assembly;
    a single box step coupled to said drive assembly and movable relative to said pivot assembly between a stowed position tucked underneath a vehicle forward of a bumper of the vehicle so as to be hidden from view, a rear position extending past a vehicle bumper, a corner position at a rear corner of the vehicle and a side entry position outwardly from a side of the vehicle to assist a user trying to access a portion of a box of the vehicle that is just behind a vehicle cab; and
    a drive arm operably coupled to the drive assembly and fixedly secured to the single box step for pivotally moving the single box step between the stowed position, the rear position, the corner position and the side entry position.

2. The pivotable box step as set forth in claim 1 further comprising a stow stop on one of a frame of the vehicle or on a mount surface of the pivotable box step, wherein said single box step is engageable with said stow stop when said single box step rotates to said stowed position.

3. The pivotable box step as set forth in claim 1 further comprising:
    a vertical motor assembly coupled to said drive assembly for driving said drive assembly in opposing first and second directions to move said single box step between said stowed position and said side entry position, wherein said vertical motor assembly includes a motor with a first worm gear and the drive assembly includes a first tooth gear, second worm gear and second tooth gear that is coupled to a drive output shaft, the first worm gear is in mesh engagement with the first tooth gear of the drive assembly, the first tooth gear is connected to and rotates in the same direction as the second worm gear, the second worm gear is in mesh engagement with the second tooth gear and the second tooth gear is connected to and rotates with the drive output shaft that is coupled to the single box step.

4. The pivotable box step as set forth in claim 3 further comprising a coupler connected to the drive output shaft and an output shaft connected between the coupler and the drive arm of the single box step.

5. The pivotable box step as set forth in claim 3 including an electronic control unit operably coupled to said motor and electronically controlling operation thereof.

6. The pivotable box step as set forth in claim 5 wherein said electronic control unit is programmed to turn off said motor after a predetermined number of rotations of the drive output shaft of the motor to stop said single box step in the side entry position.

7. A pivotable box step as set forth in claim 6 including a switch for transmitting a signal to said electronic control unit to command the motor to move the single box step between the stowed position and the side entry position upon the opening and closing of a vehicle door.

8. A pivotable box step as set forth in claim 6 including a switch electronically connected to said electronic control unit and providing a signal to the motor to move the single box step into and out of the side entry position.

9. A pivotable box step comprising:
    a pivot assembly;
    a drive assembly disposed within said pivot assembly;
    a single box step operably coupled to said drive assembly and movable relative to said pivot assembly between a stowed position tucked underneath the vehicle forward of a bumper of the vehicle so as to be hidden from view, a rear position extending past a vehicle bumper, a corner position at a rear corner of the vehicle and a side entry position outwardly from a side of the vehicle to assist a user trying to access a portion of a box of the vehicle that is just behind a vehicle cab;
    a motor operably coupled to said drive assembly for driving said drive assembly in opposing first and second directions to move said single box step between said stowed position and said side entry position; and
    an electronic control unit operably coupled to said motor and programmed to turn off said motor after a predetermined number of rotations to stop said single box step in said side entry position.

10. A pivotable box step as set forth in claim 9 including a switch for transmitting a signal to said electronic control unit to command the motor to move the single box step between said stowed position and side entry position upon the opening and closing of a vehicle door.

11. The pivotable box step as set forth in claim 9 including a drive arm operably coupled to said drive assembly and fixedly secured to said single box step for pivotally moving said single box step between said stowed position and side entry step position.

12. The pivotable box step as set forth in claim 11 further comprising a stow stop on one of a frame of the vehicle or on a mount surface of the pivotable box step, wherein said single box step is engageable with said stow stop when said single box step rotates to said stowed position.

13. The pivotable box step as set forth in claim 11 further comprising:
    wherein the motor is part of a vertical motor assembly coupled to said drive assembly for driving said drive assembly in opposing first and second directions to move said single box step between said stowed position and said side entry position, wherein said vertical motor assembly includes the motor with a first worm gear and the drive assembly includes a first tooth gear, second worm gear and second tooth gear that is coupled to a drive output shaft, the first worm gear is in mesh engagement with the first tooth gear of the drive assembly, the first tooth gear is connected to and rotates in the same direction as the second worm gear, the second worm gear is in mesh engagement with the second tooth gear and the second tooth gear is connected to and rotates with the drive output shaft that is coupled to the single box step.

14. The pivotable box step as set forth in claim 13 further comprising a coupler connected to the drive output shaft and an output shaft connected between the coupler and the drive arm of the single box step.

15. A pivotable box step comprising:
   a pivot assembly;
   a drive assembly disposed within said pivot assembly;
   a single box step coupled to said drive assembly and movable relative to said pivot assembly between a stowed position tucked underneath a vehicle forward of a bumper of the vehicle so as to be hidden from view, a rear position extending past a vehicle bumper, a corner position at a rear corner of the vehicle and a side entry position at a side of the vehicle to assist a user trying to access a portion of a box of the vehicle that is more forward or just behind the vehicle cab;
   wherein the drive assembly moves the single box step between the stowed position, rear position, corner position and side entry position;
   a drive arm operably coupled to said drive assembly and fixedly secured to said single box step for pivotally moving said single box step between said stowed position and side entry position, and
   a vertical motor assembly coupled to said drive assembly for driving said drive assembly in opposing first and second directions to move said single box step between said stowed position and said side entry position, wherein said vertical motor assembly includes a motor with a first worm gear and the drive assembly includes a first tooth gear, second worm gear and second tooth gear that is coupled to a drive output shaft, the first worm gear is in mesh engagement with the first tooth gear of the drive assembly, the first tooth gear is connected to and rotates in the same direction as the second worm gear, the second worm gear is in mesh engagement with the second tooth gear and the second tooth gear is connected to and rotates with the drive output shaft that is coupled to the single box step.

16. The pivotable box step as set forth in claim 15 further comprising a stow stop on one of a frame or the vehicle of on a mount surface of the pivotable box step, wherein said single box step is engageable with said stow stop when said single box step rotates to said stowed position.

17. The pivotable box step as set forth in claim 15 further comprising a coupler connected to the drive output shaft and an output shaft connected between the coupler and the drive arm of the single box step.

18. The pivotable box step as set forth in claim 15 including an electronic control unit operably coupled to said motor and electronically controlling operation thereof.

19. The pivotable box step as set forth in claim 15 wherein said electronic control unit is programmed to turn off said motor after a predetermined number of rotations to stop said single box step in said side entry position.

20. A pivotable box step as set forth in claim 19 including a switch for transmitting a signal to said electronic control unit to command the motor to move the single box step between said stowed position and side entry position upon the opening and closing of a vehicle door.

21. A pivotable box step as set forth in claim 19 including a switch electronically connected to said electronic control unit and providing a signal to the motor to move said single box step into and out of said side entry position.

* * * * *